United States Patent Office 3,439,048
Patented Apr. 15, 1969

3,439,048
PROCESS FOR ALKYLATION OF PHENOL
Efim Biller, Fribourg, Switzerland, assignor to Union Rheinische Braunkohlen Kraftstoff Aktiengesellschaft, Wesseling, near Cologne, Germany
No Drawing. Filed Mar. 14, 1966, Ser. No. 533,855
Claims priority, application Germany, Mar. 27, 1965, U 11,566
Int. Cl. C07c 37/16, 37/12
U.S. Cl. 260—621                                    1 Claim

ABSTRACT OF THE DISCLOSURE

The alkylation of phenol with methanol or dimethyl ether in the presence of an aqueous solution of zinc chloride or zinc bromide as the catalyst to obtain m-cresol-free methyl phenol mixtures containing predominantly o-cresol whereby the catalyst solution contains about 10–60% by weight water and small amounts of hydrogen chloride or hydrogen bromide and the conversion is carried out at 180–250° C. with an amount of alkylating agent lower than the stoichiometric requirement and the molar ratio of methanol, when used, to zinc chloride or zinc bromide being between 1:0.05 to 1 and the molar ratio of dimethyl ether, when used, to zinc chloride or zinc bromide being between 0.5:0.05 to 1.

---

This invention relates to a process for the alkylation of phenol with methanol or dimethyl ether, the alkylation in ortho-position being preferred.

The alkylation of phenol has been described in various methods. As alkylation agents there are known e.g. olefines, alcohols, ethers or alkyl halides. Mostly strongly acid catalysts are used either in anhydrous form or in aqueous solutions. Typical compounds are e.g. zinc chloride, aluminum chloride, boron trifluoride, sulfuric acid or its salts.

All these catalysts generally promote the substitution in para-position which position is already favoured because of the influence of the hydroxyl group of the phenol, so in the alkylation the substitution in para-position generally predominates. On the other hand the above-mentioned catalytically active compounds may show considerable differences in another aspect, and they cannot be interchanged in the case of a specific alkylation. It is known e.g. that the alkylation of phenol with n-butane in presence of zinc chloride and hydrochloric acid produces more p-isomers than o-isomers in the normal case, whereas working with an excess of alcohol reduces the formation of p-isomers. For example, the alkylation of phenol with olefins, e.g. isoamylene or diisobutylene, in the presence of sulfuric acid or the alkylation of phenol or toluol with olefines or alcohols in the presence of cupric sulphate gives mainly the p-isomers, in the latter case, however, the formation of m-isomers can be promoted by using high pressures (above 100 atm.). Also, when using boron trifluoride or aluminum chloride as catalysts for the reaction of toluol with diisobutylene, or of phenol with tert.-butyl chloride, mainly the p-isomer is formed.

It has now been found that when alkylating phenol with methanol or dimethyl ether in the presence of an aqueous solution of zinc chloride or zinc bromide mainly the o-isomer is obtained, if the alkylation is carried out at temperatures of about 180–250° C. and pressures of about 5–60 atm. and in the presence of hydrochloric or hydrobromic acid in such a manner that during the reaction there is a molar excess of phenol, referred to the alkylating agent, whereby the molar ratio of methanol, or dimethyl ether resp. to the zinc halide is between 1:0.05 to 1, or 0.5:0.05 to 1, resp. and the water content of the catalyst solution is between 10 and 60%.

As it was described that the alkylation of phenol with n-butane, which normally produces the p-isomer mainly, can be directed to the formation of the o-isomer by using a molar excess of n-butane, the preferable formation of o-cresol could not be expected. According to the invention it has been discovered that when reacting phenol with e.g. methanol a molar excess of alcohol has to be avoided in order to receive o-cresol mainly.

Contrary to the former opinion that the addition of some hydrogen halide to a zinc halide catalyst is not imperative, but useful for the alkylation, e.g. in order to lower the reaction temperature or to shorten the reaction time it has now been discovered that such an addition to the alkylation of phenol with e.g. methanol with the aid of zinc halide is imperative for the purpose of receiving high yields as already shown by the high reaction temperature of more than 180° C. which is required according to the invention.

EXAMPLE 1

In two tests (A and B), phenol and methanol were each mixed with a catalyst solution in a stirring autoclave, the solution containing 225 grams of zinc bromide, 16 grams of hydrobromic acid (48%) and 45 grams of water. The reactor was heated under a nitrogen pressure of 25 atm. for about 2 hours for 225° C. After the separation of the catalyst solution the unreacted phenol was removed by distillation. Table 1 shows the amounts and the molar ratios of the used products, the yields and the composition of the yielded reaction products. It has proven that raising the methanol used above a molar ratio of 1:1 (phenol/methanol) lowers the yield very much and increases the share of p-cresol in the reaction product.

TABLE 1

|  | Test A | Test B |
|---|---|---|
| Phenol used, (g.) | 470 | 470 |
| Methanol used, (g.) | 96 | 224 |
| Phenol/methanol, molar ratio | 1:0.6 | 1:1.4 |
| Yield of cresols and dimethyl phenols, based on the raw materials: | | |
| Phenol (percent of theor.) | 98.0 | 80.5 |
| Methanol (percent of theor.) | 75.3 | 45.1 |
| Reaction products (weight percent): | | |
| Phenol | 56.7 | 28.7 |
| o-Cresol | 20.4 | 21.0 |
| p-Cresol | 11.4 | 19.0 |
| 2,4-xylenol | 6.1 | 8.0 |
| 2,6-xylenol | 3.1 | 3.3 |
| Higher boiling products | 2.3 | 20.0 |
|  | 100.0 | 100.0 |

EXAMPLE 2

6 mols of phenol and 3.6 mols of methanol were reacted at a temperature of 210° C. in the presence of a catalyst solution which contains 1.8 mols of zinc chloride and 0.3 mol of hydrochloric acid and a water content of 16%. After a reaction time of 4 hours and subsequent treatment, as described in Example 1, the obtained product contained 48% o-cresol, 30% p-cresol, the rest being higher alkylated phenols.

EXAMPLE 3

9 mols of phenol were reacted with 3 mols of dimethyl ether in the presence of an aqueous catalyst solution (25%), containing 3.5 mols of zinc bromide and 0.25 mol of hydrobromic acid, during 3 hours at a temperature of 230° C. and a pressure of 35 atm. The reaction product, separated according to Example 1 from the catalyst solution and the unreacted dimethyl ether, contained about 43% o-cresol and 29% p-cresol besides 2,4- and 2,6-dimethyl phenols.

I claim:
1. A process for the ortho-alkylation of phenol comprising reacting phenol with an alkylating agent selected from the group consisting of methanol and dimethyl ether in the presence of an aqueous solution of a catalytically active compound selected from the group consisting of zinc chloride and zinc bromide and a small amount of a hydrogen halide selected from the group consisting of hydrogen chloride and hydrogen bromide, at a temperature between about 180° C. and about 250° C. and a pressure between about 5 and about 60 atm., the phenol and alkylating agent being in a molar ratio of 1 to less than 1, the molar ratio of the alkylating agent to zinc chloride or zinc bromide being between 1:0.05 to 1 in the case of methanol and 0.5:0.05 to 1 in the case of dimethyl ether and the solution of the catalytically active compound having a water content between about 10 and about 60% by weight.

References Cited
FOREIGN PATENTS 1,264,121  8/1961  France.
1,301,483  7/1962  France.

LEON ZITVER, *Primary Examiner.*

H. ROBERTS, *Assistant Examiner.*